United States Patent [19]

Imasato et al.

[11] 4,305,366
[45] Dec. 15, 1981

[54] INJECTION TIMING CONTROL SYSTEM FOR FUEL-INJECTION PUMP FOR ENGINE

[75] Inventors: Kazunari Imasato; Shigeru Yoshizawa, both of Yono; Takayuki Suzuki, Tokorozawa, all of Japan

[73] Assignees: Sanwa Seiki Mfg. Co., Ltd.; Hino Jidosha Kogyo Kabushiki Kaisha, both of Japan

[21] Appl. No.: 70,751

[22] Filed: Aug. 29, 1979

[30] Foreign Application Priority Data

Aug. 31, 1978 [JP] Japan .................................. 53-105539
Aug. 31, 1978 [JP] Japan ........................... 53-118380[U]

[51] Int. Cl.³ ............................................. F02M 59/20
[52] U.S. Cl. .................................... 123/502; 123/501; 64/25
[58] Field of Search ........... 123/502, 503, 350, 195 A, 123/500, 501; 64/24, 25

[56] References Cited

U.S. PATENT DOCUMENTS 3,258,937 7/1966 Kranc ....................................... 64/25
3,628,889 12/1971 Kobayashi ........................... 123/502
3,815,564 6/1974 Suda ..................................... 123/502

Primary Examiner—Charles J. Myhre
Assistant Examiner—Carl Stuart Miller
Attorney, Agent, or Firm—Pollock, Vande Sande & Priddy

[57] ABSTRACT

An injection timing control system for a fuel-injection pump for an engine has a phase angle regulator for varying the rotational phase angle of a drive shaft of the fuel-injection pump. The regulator has a cylindrical extension of one of an input shaft adapted to be driven by the engine and an output shafts for driving the drive shaft of the pump coaxially surrounding an end portion of the other shaft in spaced apart relationship. A male spline and female spline are formed respectively on the end portion and the extension over some axial length thereof, at least one of the splines being a helical spline. A slider is located in an annular space between the splines and formed with splines meshing therewith respectively. An annular cylinder is formed between the substantial parts of the rest axial length portions of the cylindrical extension and end portion. A piston is reciprocally received in the cylinder, the slider and piston being formed as a unit.

4 Claims, 2 Drawing Figures

INJECTION TIMING CONTROL SYSTEM FOR FUEL-INJECTION PUMP FOR ENGINE

BACKGROUND OF THE INVENTION

This invention relates to injection timing control systems for fuel-injection pumps for engines, and more particularly to an injection timing control system for a fuel-injection pump of an engine in which a phase angle regulator is provided for varying the rotational phase angle of a drive shaft of the fuel-injection pump, the regulator having an input shaft adapted to be driven by the engine and an output shaft for driving the drive shaft of the fuel-injection pump.

Heretofore, in order to increase the engine operating efficiency and to effect exhaust emission control of an internal combustion engine, such as a diesel engine, it has been customary to vary the fuel-injection timing in a fuel-injection pump used for the engine in accordance with the change of the engine speed.

Systems for varying the fuel-injection timing in fuel-injection pumps can be broadly divided into two types. One of such types detects the engine speed by means of a centrifugal type governor and causes the rotational phase angle of a drive shaft of the fuel-injection pump to vary based on the detected value. The other type detects the engine speed and the drive rotational phase angle of the fuel-injection pump independently of each other and inputs the detection signals to a computer which outputs an electric signal corresponding to a rotational phase angle of the drive shaft which best suits the engine operating condition including engine speed, the output signal of the computer being converted into hydraulic power for rendering a hydraulic actuator operative, so as to cause the hydraulic actuator to effect control of the rotational phase angle of the drive shaft of the fuel-injection pump through a link mechanism.

In the aforesaid systems of the prior art, the first system using a governor has a difficulty in increasing the response speed in effecting control thereof because of its having a non-linear characteristic. The second system is basically capable of having a superb control characteristic because the detection signals each have a linear characteristic. However, since it uses a link mechanism through which a hydraulic actuator controls the rotational phase angle of the drive shaft of the fuel-injection pump as a final step, the second system is faced with the problems that mechanical play is produced in the link mechanism after its prolonged use and this causes deterioration of its control characteristic, and that it is impossible to obtain an overall compact size of the system. Also, the arrangement whereby the detection mechanisms for the engine speed and the rotational phase angle of the drive shaft of the fuel-injection pump are provided independently is a factor concerned in the inability to obtain an overall compact size of the system. It is important to obtain an overall compact size of the system, since if the overall size of the system is not compact, then it is impossible to mount the system snugly in the narrow engine room and no small difficulty is encountered in installing the system.

SUMMARY OF THE INVENTION

An object of this invention is to provide an injection timing control system for a fuel-injection pump for an engine which produces almost no mechanical play after prolonged service, so that the system shows almost no deterioration of control characteristic.

Another object is to provide an injection timing control system for a fuel-injection pump for an engine which makes it possible to obtain an overall compact size of the system, so that the system can be mounted snugly in the narrow engine room with ease.

According to the present invention, there is provided an injection timing control system for a fuel-injection pump for an engine comprising a phase angle regulator for varying the rotational phase angle of a drive shaft of the fuel-injection pump, said regulator including an input shaft adpated to be driven by the engine and an output shaft for driving the drive shaft of the fuel-injection pump, characterized in that said phase angle regulator further includes a cylindrical extension of one of said input shaft and said output shaft coaxially surrounding an end portion of the other shaft in spaced apart relationship, a male spline formed on said end portion of said other shaft over some axial length of the end portion, a female spline formed on said cylindrical extension of said one shaft over some axial length of the cylindrical extension, at least one of said male spline and female spline being a helical spline, a slider located in an annular space between said male spline and said female spline and formed with splines meshing with said male spline and female spline respectively, an annular cylinder formed between the substantial part of the rest axial length portion of said cylindrical extension and the substantial part of the rest axial length portion of said end portion, and a piston reciprocally received in said cylinder, said slider and piston being formed as a unit.

In one embodiment, said one shaft may be the input shaft and said other shaft is the output shaft. Said male spline is a parallel spline and said female spline is a helical spline.

The injection timing control system may further comprise first detector means for detecting the rotational speed and rotational angle of said input shaft of said phase angle regulator, second detector means for detecting the rotational speed and rotational angle of said output shaft of said phase angle regulator, a computer electrically connected to said first and second detector means to receive detection signals therefrom for producing an output signal which can provide to the drive shaft of the fuel-injection pump an optimum rotational phase angle at that specific point in time, and hydraulic circuit means including a hydraulic control valve operable in response to said output signal of said computer for supplying pressurized fluid to said cylinder of said phase angle regulator to drive said piston.

Said input shaft of said phase angle regulator may be driven by the engine through a gear train including a gear mounted on the input shaft, said first detection means may include one of gears of said gear train and an electromagnetic pickup located in close proximity to teeth of said one of gears of said gear train, and said detection means may include a disk mounted on the side of said output shaft of said phase angle regulator and formed with at least one projection on its outer circumference and an electromagnetic pickup located in close proximity to said outer circumference of said disk.

DESCRIPTION OF THE PREFERRED EMBODIMENTS

Figure 1:
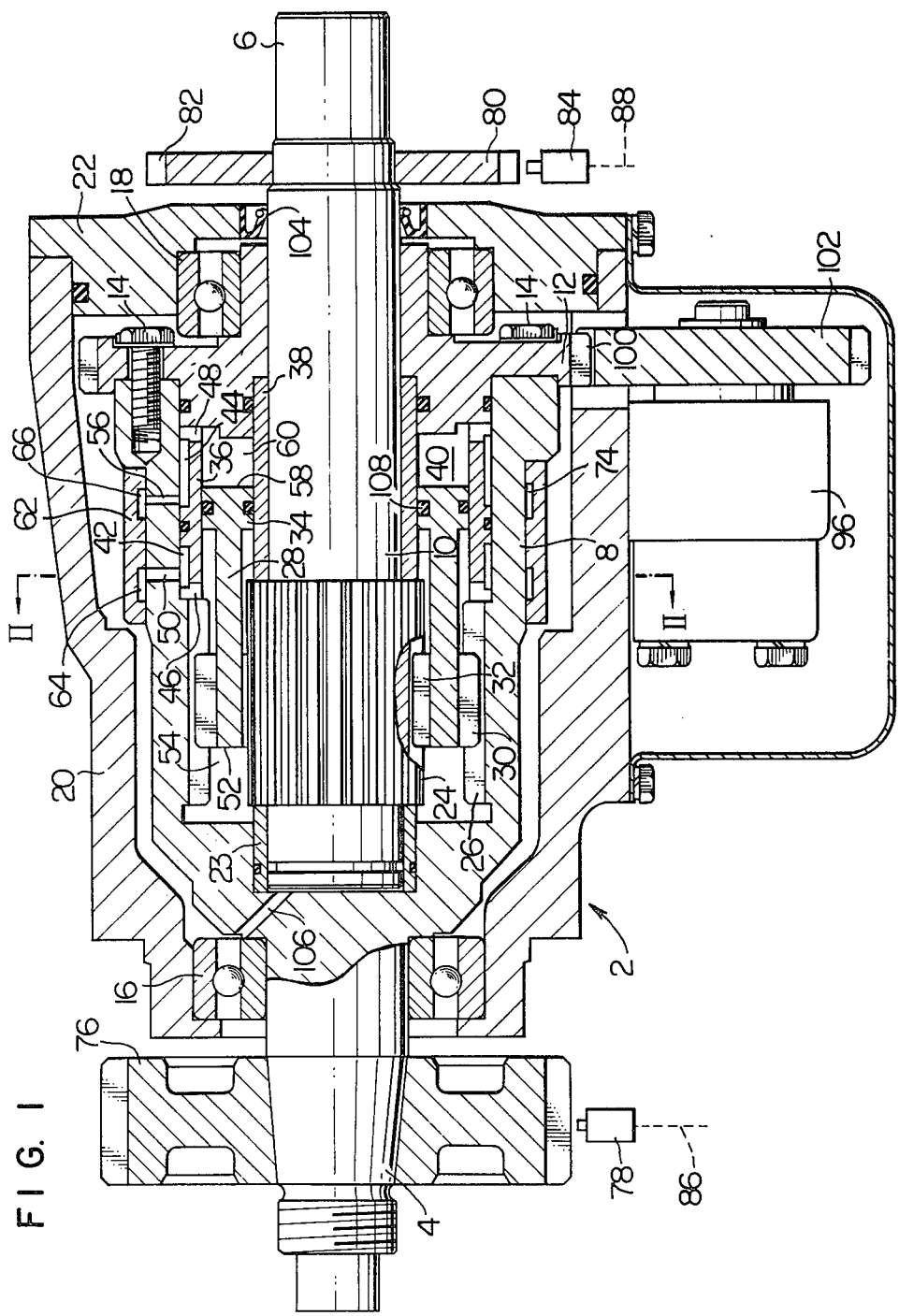
FIG. 1 is a longitudinal sectional view of the phase angle regulator of the injection timing control system which comprises one embodiment according to the invention.

A preferred embodiment of the invention will now be described by referring to the accompanying drawings, in which FIG. 1 shows a phase angle regulator 2 for varying the rotational phase angle of a drive shaft of a fuel-injection pump (not shown), the phase angle regulator being an important element of the injection timing control system for the fuel-injection pump according to the invention.

The phase angle regulator 2 comprises an input shaft 4 adapted to be driven by an engine (not shown) and an output shaft 6 for driving the drive shaft of the fuel-injection pump. The input shaft 4 has a cylindrical extension 8 coaxially surrounding an end portion 10 of the output shaft 6 in spaced apart relationship. The extension 8 has an end plate 12 secured to its end by a plurality of bolts 14. The input shaft 4, extension 8 and end plate 12 are rotatably supported as a unit by bearings 16 and 18 in a casing 20 and end plate 22, the casing 20 enclosing the extension 8 and end plate 12, and the end plate 22 being secured to the casing 20 by bolts (not shown).

The output shaft 6 is rotatably supported by a sleeve 23 fitted to the input shaft 4 and by the end plate 12 secured to the extension 8. The output shaft 6 is formed on the end portion 10 with a male parallel spline 24 over some axial length thereof, the spline 24 having grooves parallel to the axis of the shafts 4 and 6. The extension 8 of the input shaft 4 is formed thereon with a female helical spline 26 over some axial length thereof, the spline 26 having grooves obliquely inclined with respect to the axis of the shafts 4 and 6.

Located in an annular space between the male parallel spline 24 and the female helical spline 26 is a slider 28 mounted for axial sliding movement. The slider 28 is formed thereon with a male helical spline 30 meshing with the female helical spline 26 on the extension 8 and with a female parallel spline 32 meshing with the male parallel spline 24 on the output shaft 6.

An annular piston 34 formed as a unit with the slider 28 is reciprocally received in an annular cylinder 40 defined by a sleeve 36 fitted on the substantial part of the rest axial length portion of the extension 8 of the input shaft 4 and by a sleeve 38 secured to the end plate 12 so as to rotatably support the end portion 10 of the output shaft 6 over the substantial part of the rest axial length portion thereof. The sleeve 36 is formed therein with annular grooves 42 and 44 and holes 46 and 48. The extension 8 is formed therein with a hole 50 communicating through the groove 42 and hole 46 with a cylinder chamber 54 facing an end surface 52 of the slider 28, and with a hole 56 communicating through the groove 44 and hole 48 with a cylinder chamber 60 facing an end surface 58 of the piston 34.

Figure 2:
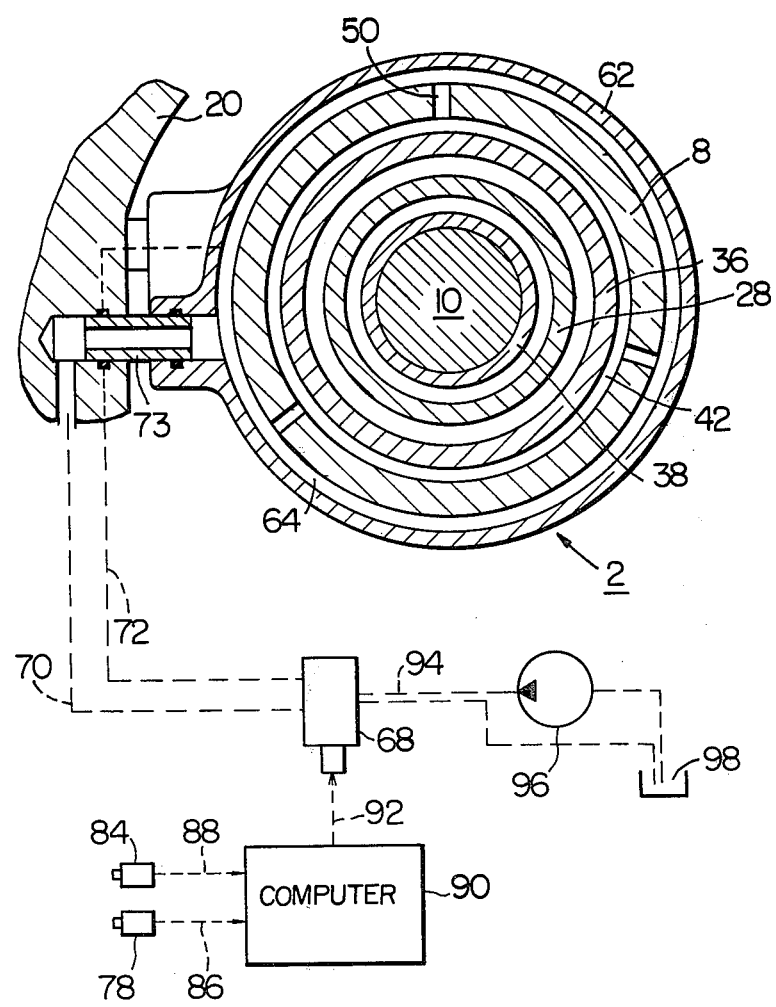
FIG. 2 is a schematic view of the injection timing control system according to the invention, with the phase angle regulator being shown in cross section taken along the line II—II in FIG. 1.

A rotary joint 62 is formed therein with annular grooves 64 and 66. As shown in FIG. 2, hydraulic lines 70 and 72 extend from a hydraulic control valve 68 and are connected, through suitable connecting pipes 73, to the rotary joint 62 to communicate with the grooves 64 and 66 respectively. The rotary joint 62 is secured to the casing 20 so as to permit the extension 8 of the input shaft 4 to rotate in a seal sliding manner on an outer periphery 74 of the extension 8. The grooves 64 and 66 communicate with the holes 50 and 56 respectively.

A gear 76 mounted on the input shaft 4 performs the function of introducing rotary force from the engine. An electromagnetic pickup 78 located in close proximity to teeth of the gear 76 is a detector for electrically detecting the rotational speed and the rotational angle of the input shaft 4. A disk 80 mounted on the output shaft 6 is formed on its outer circumference with at least one projection 82, and an electromagnetic pickup 84 located in close proximity to the outer circumference of the disk 80 is, like the electromagnetic pickup 78, a detector for electrically detecting the rotational speed and the rotational angle of the output shaft 6.

As shown in FIG. 2, the electromagnetic pickups 78 and 84 are electrically connected to a computer 90 through signal lines 86 and 88 respectively. The computer 90 which receives electrical signals from the electromagnetic pickup 78 is operative to calculate a deviation between an optimum value of the rotational phase angle of the drive shaft of the fuel-injection at each time when it has received the signals and the actual rotational phase angle of the drive shaft at the same time, and produce an electrical output signal to remove the deviation if there is such a deviation, that is produce an electrical output signal which can provide to the drive shaft of the fuel-injection pump an optimum rotational phase angle at any specific point in time. The computer 90 is connected through a signal line 92 to the hydraulic control valve 68 which regulates the flow of pressurized fluid or oil delivered through a hydraulic line 94 from a hydraulic pump 96 such as a gear pump. The numeral 98 designates a reservoir which, along with the hydraulic elements referred to hereinabove, constitutes a hydraulic circuit means for supplying pressurized fluid to the cylinder 40 of the phase angle regulator 2 to drive the piston 34.

The hydraulic pump 96 is mounted on and bolted to the casing 20 as shown in FIG. 1 and driven through a gear 100 formed on the outer circumference of the end plate 12 and a gear 102 secured to a shaft of the pump 96 and meshing with the gear 100.

The numeral 104 designates an oil seal for the output shaft 6, 106 a hole for releasing a leak of pressurized fluid or oil, and 108 seal means mounted in portions requiring a liquid-tight seal.

In operation, rotary force from the engine is transmitted through the gear 76, input shaft 4, extension 8, female helical spline 26, slider 28, male parallel spline 24 and output shaft 6 to the drive shaft of the fuel-injection pump coupled to the output shaft 6, thereby to drive the pump. The input shaft 4 also drives the hydraulic pump 86 through the gear 100 on the end plate 12 and the gear 102 on the shaft of the pump 86.

In this state, since the input shaft 4 is driven by the engine to which it is connected through a gear train including a gear 76, the electromagnetic pick-up 78 which detects the rotational speed and rotational angle of the input shaft 4 can achieve the same results as if it were detecting the rotational speed of the engine shaft, that is engine speed, and the rotational angle of the engine shaft. Meanwhile, the electromagnetic pickup 84 which detects the rotational angle of the output shaft 6 can detect the displacement or relative rotational phase angle with respect to the rotational angle of the input shaft 4 which corresponds to the rotational phase angle of the drive shaft of the fuel-injection pump. The values detected are calculated by the computer in such a manner that the fuel-injection pump can carry out fuel-injection at the most optimum rotational phase angle of the drive shaft for each engine operating condition including engine speed. The computer 90 produces an output voltage (analog) or an output pulse voltage (digital) which actuates the hydraulic control valve 68 through the signal line 92, with a result that the hydraulic control valve 68 allows pressurized fluid to pass through the hydraulic line 70 or 72 in an amount corresponding to the output voltage or output pulse voltage.

The hydraulic control valve 68 is a proportional control valve when the voltage signal from the computer 90 is an analog signal and an on-off control valve when it is a digital signal.

In the operation described hereinabove, when the flow of pressurized fluid is given to the hydraulic line 70 and the hydraulic line 72 is communicated with the reservoir 98, the pressurized fluid is introduced through groove 64, hole 50, groove 42 and hole 64 to the cylinder chamber 54 facing the end surface 52 of the slider 28, while the fluid in the cylinder chamber 60 facing the end surface 58 of the piston 34 is discharged through hole 48, groove 44, hole 56, groove 66, hydraulic line 72 and hydraulic control valve 68 to the reservoir 98. As a result, the slider 28 is moved rightwardly in FIG. 1 by the pressurized fluid introduced into the cylinder chamber 54. Rightward movement of the slider 28 causes the output shaft 6 to increase its rotational phase angle relative to the input shaft, because the female helical spline 26 has grooves obliquely inclined with respect to the axis of the shafts 4 and 6 although the male parallel spline 24 has grooves parallel to the axis.

The increase in the rotational phase angle which represents the rotational phase angle of the drive shaft of the fuel-injection pump is monitored or detected by the electromagnetic pickups 78 and 84 at all times, so that the hydraulic control valve 68 is closed when the increasing rotational phase angle has reached a value corresponding to the programmed optimum rotational phase angle for the prevailing engine operating condition including engine speed. As a result, the rightward movement of the slider 28 stops.

Conversely, when the rotational phase angle of the output shaft 6 is to be reduced relative to the input shaft 4 in accordance with the prevailing engine operating condition, the system operates similarly in such a manner that the flow of pressurized fluid is given to the hydraulic line 72 and the hydraulic line 70 is communicated with the reservoir 98, so that the pressurized fluid is introduced into the cylinder chamber 60 facing the end surface 58 of the piston 34 so as to move the slider 28 leftwardly in FIG. 1, and then the leftward movement of slider 28 stops when the reducing rotational phase angle has reached a value corresponding to the programmed optimum rotational phase angle for the prevailing engine operating condition.

Although the embodiment shown and described hereinabove has a helical spline in the female spline 26 and a parallel spline in the male spline 24, the invention is not limited to this specific form, and the male spline 24 may be formed as a helical spline and the female spline 26 may be formed as a parallel spline. Alternatively, the male and female splines 24 and 26 may be both formed as helical splines. Also, the arrangement of the input shaft 4 and the output shaft 6 may be reversed so that the output shaft 6 may be driven by the engine and the input shaft 4 may drive the drive shaft of the fuel-injection pump. It will be apparent that the reversed arrangement can achieve the same results as the arrangement shown and described hereinabove.

Moreover, although the embodiment has been shown and described as having splines 24 and 26 adjacent to the end of the end portion 10 and cylinder 40 remote therefrom, the arrangement also may be reversed so that the cylinder 40 may be positioned adjacent the end of the end portion 10 and the splines 24 and 26 may be positioned remote from the end.

Furthermore, the formation of the gear 100 is also not limited to the specific form shown in FIG. 1, and the gear 100 may be provided by mounting a ring gear on the side surface of the end plate 12. Also, the gear 100 may be formed or mounted on a suitable portion of the outer periphery of the extension 8 as far as it is adapted to be driven by rotation of the extension 8.

Furthermore, the electromagnetic pickup 78 may be located in close proximity to a gear other than the gear 76 as far as one of the gears of the existing gear train for transmitting rotary force from the engine to the input shaft of the phase angle regulator is utilized. Also, the disk 80 may be mounted on another element such as a drive shaft of the fuel-injection pump as far as it is one of elements for driving the fuel-injection pump.

From the foregoing, it will be appreciated that the piston 34 of the phase angle regulator 2 of the system according to the invention is formed as a unit with the slider 28, and that no link mechanism is provided between the slider 28 and piston 34. Thus, the system is free from the danger of mechanical play being produced therein. This enables the response of the system to be improved, and permits the engine operating efficiency to be increased and the exhaust emission control to be effected satisfactorily at the time of acceleration and deceleration. This also enable to obtain an overall compact size of the system, so that when the system is used with an engine of an automotive vehicle. The system offers the advantage that it can be snugly fitted in the narrow engine room without any trouble.

Moreover, in the injection timing control system according to the invention, the speed and rotational angle of the engine are detected by utilizing the gear 76 which is one of gears of a gear train for transmitting rotary force from the engine to the input shaft 4 of the phase angle regulator 2. This arrangement eliminates the need to mount an additional disk or other element on the input shaft 4 and makes it possible to reduce the axial length of the phase angle regulator 2, thereby enabling an overall compact size to be obtained in the injection timing control system.

What is claimed is:

1. An injection timing control system for a fuel-injection pump for an engine, comprising: a phase angle regulator for varying the rotational phase angle of a drive shaft of the fuel-injection pump, said regulator including an input shaft adapted to be driven by the engine and an output shaft for driving the drive shaft of the fuel-injection pump, with a cylindrical extension of one of said input and output shafts coaxially surrounding an end portion of the remaining shaft in spaced apart relationship, a male spline formed on said end portion of said remaining shaft and a female spline formed on said cylindrical extension of said one shaft, at least one of said male and female splines having a helical spline configuration, a slider located in an annular space between said male spline and female spline and formed with splines meshing with said male spline and female spline, respectively, an annular cylinder formed between said cylindrical extension and said end portion, with a piston reciprocally received in said annular cylinder, and rigidly attached to said slider for joint movement therewith;

said annular cylinder comprising a double chamber type cylinder including a first chamber portion in fluid communication with a first end surface of said piston and further including a second chamber portion in fluid communication with a second end surface of said piston; said phase angle regulator further including first port means in fluid communication with said first chamber portion and second port means in fluid communication with said second chamber portion and means for selectively supplying a stream of pressurized fluid to either said first chamber portion or said second chamber portion to selectively move said piston within said double chamber type cylinder, whereby said integrally attached slider is caused to move relative to said male and female splines to eliminate any deviation between an actual rotational phase angle of the fuel injection pump drive shaft and an optimum rotational phase angle for prevailing engine operating conditions.

2. An injection timing control system according to claim 1, wherein the system further comprises first detector means for detecting the rotational speed and rotational angle of said phase angle regulator input shaft, second detector means for detecting the rotational speed and rotational angle of said phase angle regulator output shaft, and computer means electrically connected to said first and second detector means for calculating the actual rotational phase angle of said fuel-injection pump drive shaft from said detection signals and for calculating the deviation between said actual rotational phase angle and a programmed optimum rotational phase angle for prevailing engine operating conditions, whereby said computer means transmits an output signal to a hydraulic circuit means for supplying hydraulic fluid to either said first or second port means as required to eliminate said deviation.

3. An injection timing control system according to claim 2, wherein said hydraulic circuit means comprises a hydraulic control valve electrically connected to said computer means for selectively supplying a stream of pressurized hydraulic fluid to said first and second chamber portions in response to specific output signals generated by said computer means.

4. An injection timing control system according to either claim 2 or 3, wherein said input shaft of said phase angle regulator is driven by the engine through a gear train including a gear mounted on the input shaft, said first detection means including one of the gears of said gear train and an electromagnetic pickup located in close proximity to teeth of said one of the gears of said gear train, and said second detection means includes a disk mounted on said output shaft of said phase angle regulator and formed with at least one projection on its outer circumference, with an electromagnetic pickup located in close proximity to said outer circumference of said disk.

* * * * *